United States Patent [19]

Bode

[11] 4,380,029

[45] Apr. 12, 1983

[54] DATA RECORDING FORMAT AND METHOD AND APPARATUS FOR PRODUCING SAME

[75] Inventor: Elwood J. Bode, Newark, Calif.

[73] Assignee: BTI Computer Systems, Sunnyvale, Calif.

[21] Appl. No.: 243,534

[22] Filed: Mar. 13, 1981

[51] Int. Cl.³ .............................................. G11B 5/09
[52] U.S. Cl. ...................................... 360/48; 360/53
[58] Field of Search .................. 360/48, 53; 371/2, 37

[56] References Cited

U.S. PATENT DOCUMENTS

| | | | |
|---|---|---|---|
| 4,117,458 | 9/1978 | Burghard et al. | 371/37 |
| 4,276,646 | 6/1981 | Haggard et al. | 371/37 |
| 4,282,551 | 8/1981 | Kanazawa et al. | 360/53 |

*Primary Examiner*—Vincent P. Canney
*Attorney, Agent, or Firm*—Thomas H. Olson

[57] ABSTRACT

A sector of data to be recorded on a magnetic medium is formatted by dividing the data sector into a plurality of data segments. Recorded with each segment is a time code which is identical for all segments in a given sector. During recordation of the data and time code for each segment, a cyclic redundancy check (CRC) signal is generated and the CRC signal is recorded after the data and the time code. As data in a segment is recorded, it is also temporarily stored. The temporarily stored data is combined according to a prescribed function with data in the succeeding segment and that function is temporarily stored for combination with the data in the next succeeding segment so that after all segments of data have been recorded there is a function that uniquely represents the data in all data segments. The function is recorded as a check segment. On recovery of the data, an error in any given segment can be detected by employment of the CRC signal associated with the segment containing an error. Reconstruction of the data in the erroneously recorded or read segment can be achieved by combining the contents of the correctly recorded and read data segments and the check segment, provided that the time codes read in these segments are identical.

9 Claims, 9 Drawing Figures

SECTOR 86

HEADER 88

DATA SEGMENT 98
(CHECK SEGMENT 108)

DATA RECORDING FORMAT AND METHOD AND APPARATUS FOR PRODUCING SAME

FIELD OF THE INVENTION

This invention relates to an improved format for recording data on a magnetic storage medium and the like and more particularly to a format that affords identification and correction of recording errors.

DESCRIPTION OF THE PRIOR ART

Data stored on magnetic disks is typically organized in sectors each of which has a unique address followed by a stream of data. The address permits the sector to be identified so that the desired data can be recovered or read. Because the weakest links in a magnetic storage system are the magnetic medium and the medium/head interface, erroneous recording and recovering of data usually arises from magnetic deficiencies rather than from electronic deficiencies. If the stored data is incorrect due to inaccuracies in recording or recovering the data, it is desirable to know that an error has occurred and to be able to correct the error.

One technique for affording an indication whether an error in data recording and/or recovering has occurred is known as a Cyclic Redundancy Check as described in Signetics "BiPolar/MOS Microprocessor Data Manual," Copyright 1977, at page 112. Cyclic Redundancy Check is referred to hereinafter as CRC. In a CRC system selected data bits are combined in accordance with a prescribed equation to produce a CRC signal which is recorded in a sector after the data is recorded in the sector. If on recovering the data and the CRC and subjecting the data to the same equation to derive a new CRC, the new CRC is different from the recorded CRC, such difference is an indication of erroneous recording and/or reading. The CRC system merely indicates the existence of an error but does not permit correction of the erroneous data recording.

SUMMARY OF THE INVENTION

In accordance with the present invention a sector of data composed of a plurality of data bits in binary or other form is converted into a group of data segments wherein each data segment is of uniform length and is smaller than a sector. If each sector is grouped or formed into n data segments, then each data segment has 1/n times the number of bits as in the entire sector so that all bits are recorded. Each data segment is recorded with a timing pattern and a CRC field that is related only to the data segment, and in addition the data in each data segment is combined with the data in all other data segments in a unique manner to produce a check segment which is recorded after all data segments are recorded. The check segment, which can be created by combining all data segments in an exclusive OR circuit, is a function of the contents of all data segments so that if one data segment is in error, its true value can be recovered by properly combining the correctly recorded data segments and the check segment. The identity of the supposed erroneous data segment is established in accordance with the prior art by comparing each CRC field with the data in its associated data segment. Accordingly, the present invention not only provides for an indication of erroneous recording but also a procedure for reconstructing the erroneously recorded data into correct data.

The above-mentioned timing signal is used in conjunction with each segment and is prevented from changing until the completion of recording of all segments in a sector. Accordingly, only if the timing signals associated with all segments in a sector are the same does the circuit attempt to recover the data.

An object of the invention is to so format data before its recordation onto a magnetic disk or like medium that any errors in recording or reading are made known and certain types of errors can be corrected.

Another object of the invention is to provide a circuit for achieving the last-mentioned object which can be introduced into existing equipment without substantial modification thereto. This object is achieved because the circuit of the invention is adapted for installation between an existing central processing unit and an existing disk drive unit and is adapted to operate on the data without adversely affecting data flow between such existing units.

The foregoing, together with other objects, features and advantages, will be more apparent after referring to the following specification and the accompanying drawings.

DESCRIPTION OF THE PREFERRED EMBODIMENT

Figure 1:
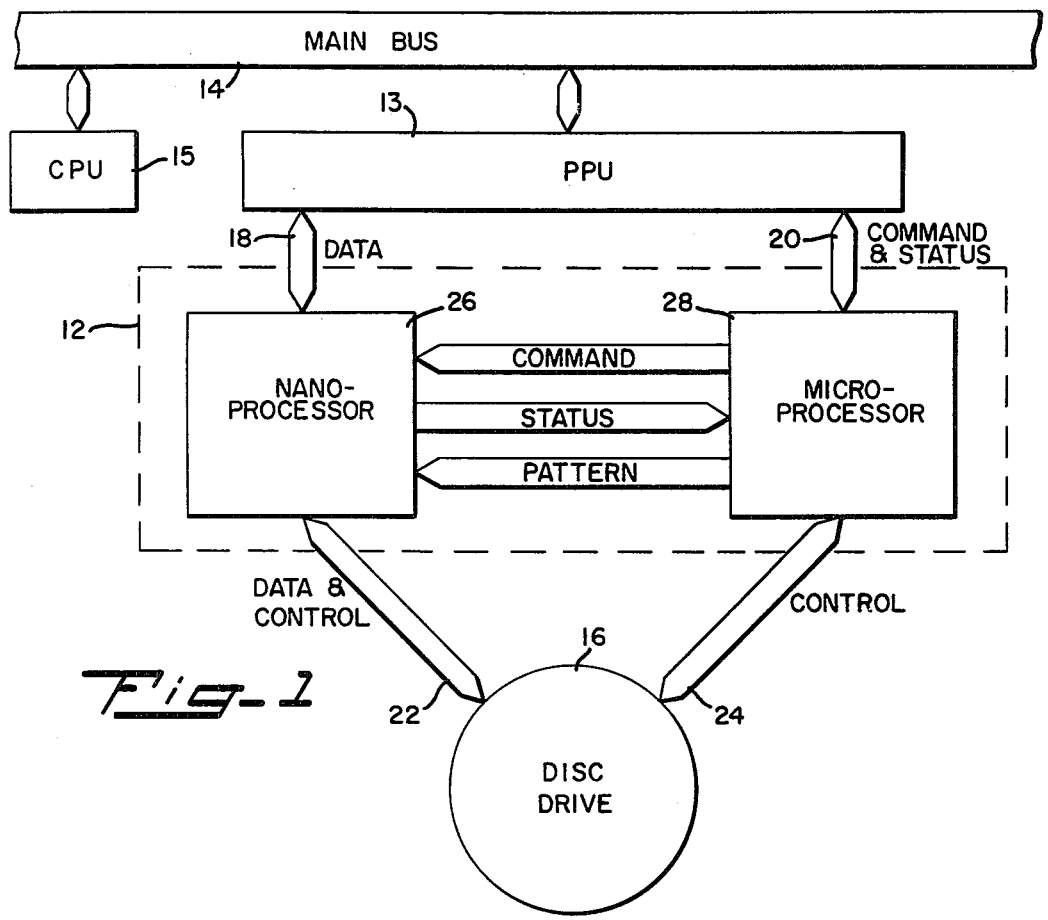
FIG. 1 is a block diagram of a data transmission system in accordance with the present invention.

Referring more particularly to the drawings, reference numeral 12 indicates formatting apparatus according to the invention which is shown in association with a peripheral processing unit (PPU) 13 coupled to a main bus 14 to which a central processing unit (CPU) 15 is also connected. Formatting apparatus 12 is connected between PPU 13 and a disk storage system or disk drive 16. Peripheral processing unit 13 is a part of an existing computer and is controlled by the computer for effecting writing of data into disk drive 16 and reading the data therefrom. As is typical of systems of this nature there is a data bus 18 extending from peripheral processing unit 13 and a command/status bus 20. The data is supplied to and from the peripheral processing unit over the data bus, and command and other related control signals are supplied to and from the processing unit on command/status bus 20. There are circuit paths between formatting apparatus 12 and disk drive 16; they will be described in more detail herinafter.

Formatting apparatus 12 includes a nanoprocessor 26, which controls data flowing between peripheral processing unit 13 and disk drive 16, and a microprocessor 28, which is connected to command/status bus 20 and disk drive 16. Microprocessor 28 controls nanoprocessor 26.

Figure 2:
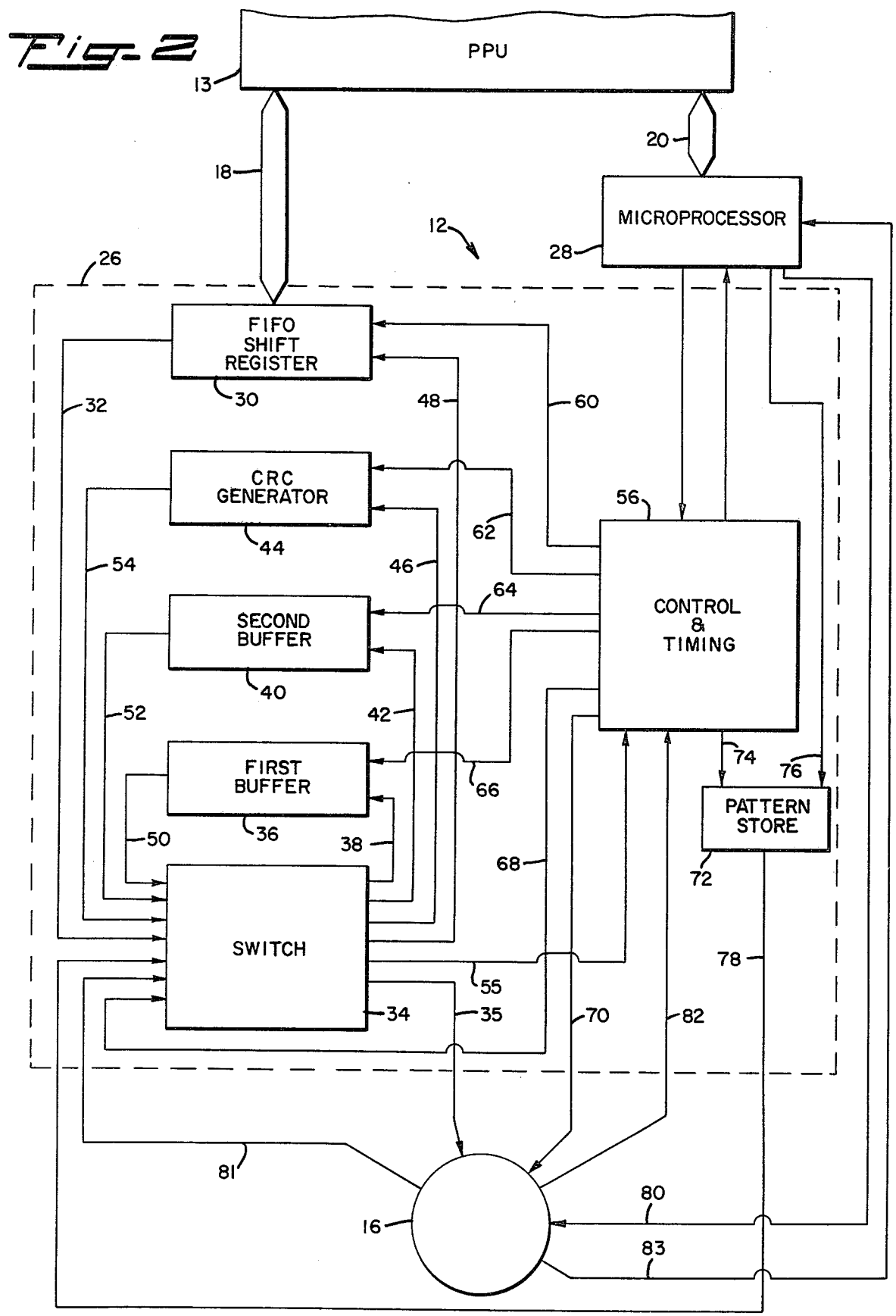
FIG. 2 is a block diagram of a portion of FIG. 1 in more detail.

FIG. 2 shows in more detail the construction of nanoprocessor 26. Data is coupled on bus 18 to an input/output FIFO shift register 30 which has its output coupled by a circuit path 32 to a switch 34. The functions of switch 34 will be described subsequently. Among other things, switch 34 couples data via a circuit path 35 to disk drive 16. Switch 34 also couples data to a first buffer 36 via a path 38 and to a second buffer 40 via a path 42. Buffers 36 and 40 function to store data temporarily during transfer of data between PPU 13 and disk drive 16 for purposes that are explained below; the buffers can be embodied in RAMs. Switch 34 also couples data to a CRC generator 44 via a path 46 and to input/output shift register 30 via a path 48. Additionally, switch 34 receives data inputs from first buffer 36 on a path 50, from second buffer 40 on a path 52 and from CRC generator 44 on a path 54. Finally, switch 34 has a flag output path 55 on which appears a state signal indicative of accurate (or inaccurate) recordation or recovery of data.

The circuits enumerated in the preceding paragraph respond to command signals supplied over bus 20. Such signals are processed by microprocessor 28 to cause nanoprocessor 26 to convert data received by it on bus 18 into a format according to the invention. The specific nature of the format is dictated by a control and timing circuit shown schematically at 56. Because the elements that constitute control and timing circuit 56 are not per se novel, a description of the various functions performed by the control and timing circuit suffices to afford an understanding of the circuit. There are signal paths between the control and timing circuit 56 and each of the elements previously specified. More specifically, there is a control path 60 extending from the control and timing circuit to input/output shift register 30, a control path 62 extending to CRC generator 44, a control path 64 extending to second buffer 40, a control path 66 extending to first buffer 36, a control path 68 extending to switch 34 and a control path 70 extending to disk drive 16.

There is a pattern store 72 which has an input 74 from control and timing circuit 56 and an input 76 from microprocessor 28. Pattern store 72 has an output 78 coupled to the input of switch 34. The pattern store is loaded from microprocessor 28 with a time signal for recordation in disk drive 16 which time pattern is prevented from changing during recordation of a given sector. Additionally, there is a control path 80 extending from microprocessor 28 to disk drive 16 for providing timing signals during recording and recovery of the data. A data path 81 extends from disk drive 16 to switch 34; data is transmitted over path 81 upon readout of the data from disk drive 16. A circuit path 82 from disk drive 16 to control and timing circuit 56 and a circuit path 83 from the disk drive to microprocessor 28 convey signals indicative of the status of the disk drive to the control and timing circuit and the microprocessor.

Although switch 34 can be embodied in a variety of forms, a suitable form, seen in FIGS. 3A–3D includes a read only memory (ROM) 84. At the upper left are the data inputs to the ROM which correspond to those seen in FIG. 2. At the right hand side are outputs of the switch corresponding to those shown in FIG. 2. At the lower left, control path 68 is seen to be composed of a plurality of lines, and the digital signal pattern on the lines dictates the interconnections established between the data inputs and the data outputs of the ROM. ROM 84 also is capable of generating an exclusive OR (XOR) function, such function being pictorially and schematically indicated at 85 and being described more fully hereinbelow.

Figure 4:
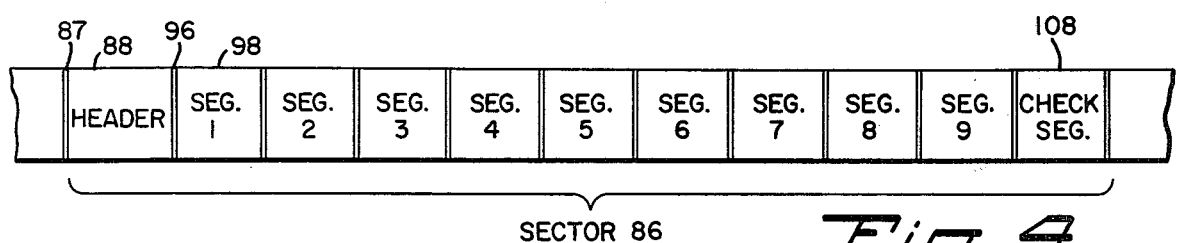
FIG. 4 is a pictorial diagram of a sector of data recorded in accordance with the invention.
Figure 5:
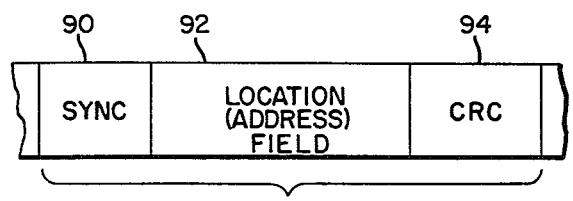
FIG. 5 is a pictorial diagram of the header of the data format of FIG. 4.
Figure 6:
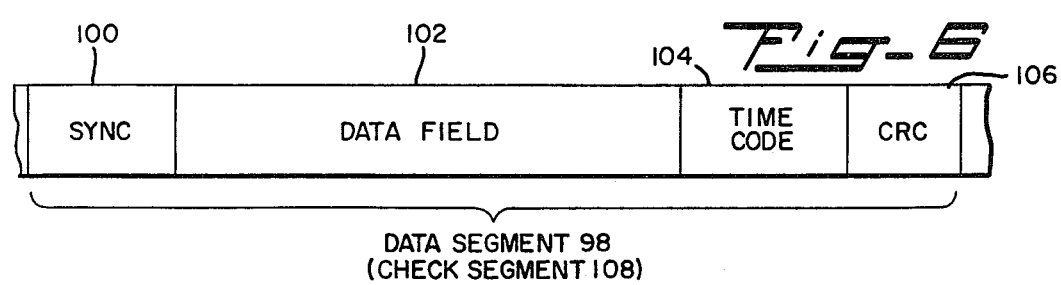
FIG. 6 is a pictorial diagram of the data segment of the data format shown in FIG. 4.

As will appear subsequently, the above-described apparatus produces a data format schematically depicted in FIGS. 4, 5 and 6. Shown in those figures is a portion of a single data track on a magnetic medium in disk drive 16, the portion at the left hand extremity of each figure leading the portion at the right hand figure as the magnetic medium moves relative to a conventional read/write head (not shown). Referring to FIG. 4, each sector 86 begins with a header gap 87 which identifies the beginning of a sector and synchronizes the clock in disk drive 16. Next is a header 88 which uniquely identifies the sector so that the sector can be addressed. Gap 87 and header 88 are permanently written on the magnetic medium. As seen in FIG. 5 header 88 includes a sync portion 90, which can be composed of a bit pattern suitable for preparing system logic for receipt of further data. Next, the header has a location or address field 92. Location field 92 can include a plurality of bits, e.g., 32 bits, that provide a unique address for each sector 86 within a given disk drive system. Finally, the header includes a CRC portion 94 which contains a prescribed number of bits, e.g., 15, and has a value derived from the specific signal recorded in location field 92 so that on readout of the data a comparison of a CRC signal generated from the data stored in location field 92 and the CRC signal stored in portion 94 indicates whether an error exits in the reading process. Following header 88 is a gap 96 which produces a signal indicating termination of the header segment and commencement of a first data segment 98. The composition of the information written in first data segment 98 is seen in greater detail in FIG. 6.

Data segment 98 commences with a sync field identified at 100. The sync field defines the beginning of a data segment and is composed of a binary signal, e.g., a series of eight ones, for preparing system logic for ensuing data. Next is a data field 102 in which is recorded a segment of data, i.e., a portion of the data in the entire sector. In one system designed in accordance with the invention there are nine data segments exemplified by data segment 98, and the data field in each contains 115 32-bit words or a total of 3,680 bits. Next, data segment 98 contains a time code portion 104 which can be a series of 32 bits indicative of the time of writing the data. As has been indicated and will be recapitulated subsequently, microprocessor 28 in cooperation with pattern store 72 assures that the time code recorded in each segment will be uniform throughout all segments in a given sector. Finally, data segment 98 includes a CRC portion 106 which includes a signal having a value that is a function of the information recorded in data field 102 and time code portion 104 so that upon readout, comparison of the recorded CRC signal with a CRC signal generated from the data field and time code portion as they are read from the medium in disk drive 16 provides an indication of errors or the lack thereof in writing or reading of the data.

The remaining data segments which are identified in FIG. 4 by the legends SEG 2–SEG 9 are equivalent to data segment 98 and are recorded in sequence on the magnetic medium. After data SEG 9 is recorded a check segment 108 is generated and recorded. Check segment 108 is identical in format to data segment 98 and the information recorded in data field 102 of check segment 108 is a prescribed function of the data recorded in the data fields of the preceding nine data segments. Such function is exemplified in the apparatus shown in FIGS. 3A–3D as an exclusive OR (XOR) function. Thus, if the data field in one of the data segments is erroneously written or read, the content of such data segment can be reconstructed from the function recorded in the data field of check segment 108 and the data recorded in the remaining correctly recorded and read data segments.

Figure 3A:
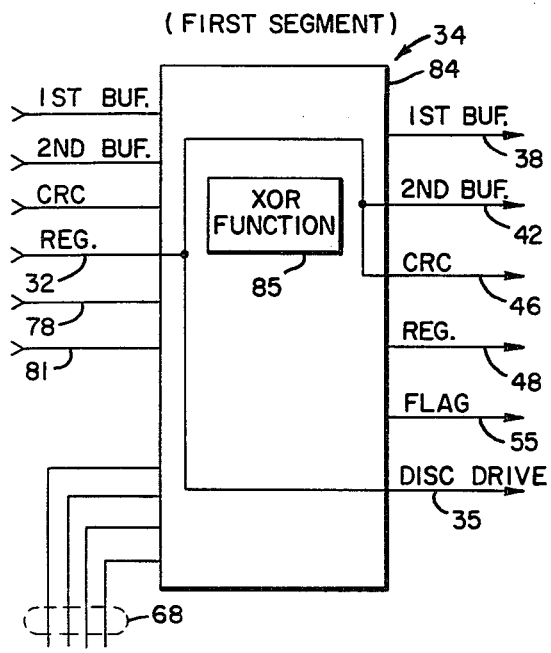
FIGS. 3A-3D are block diagrams of a portion of FIG. 2 in alternate positions and in still more detail.

The procedure for producing the check segment data field will be explained in connection with FIGS. 2 and 3A–3D. Referring to FIG. 2, data coupled over bus 18 to shift register 30 is applied to switch 34 over path 32. Under the control of control and timing circuit 56 acting on paths 60 and 68, the data field of the first data segment is recorded on disk drive 16 over path 35. The connections effected by switch 34 for recording the data in the first data segment are shown in FIG. 3A. Simultaneous with application of the data over path 35 to the disk drive, the data is also applied to second buffer 40 over path 42 for temporary storage and to CRC register 44 over path 46.

Data in the second data segment (see FIG. 3B) is similarly transmitted by switch 34 from circuit path 32 to circuit path 35. The data is also applied to CRC generator 44 over path 46. Additionally, the incoming data field for data segment 2 is combined with the data previously stored in the second buffer (applied over circuit path 52) to produce an XOR function at 85. The XOR function is applied to first buffer 36 over path 38 for temporary storage in that buffer.

During recordation of data in the third data segment (see FIG. 3C) switch 34 couples the data from path 32 to path 35 and to path 46. In addition, the data is combined with the contents of the first buffer (applied over circuit path 50) to produce an XOR function of the data contained in data segments 1, 2 and 3. Such XOR function, produced at 85, is supplied to the second buffer on path 42 for storage in that buffer.

Figure 3B:
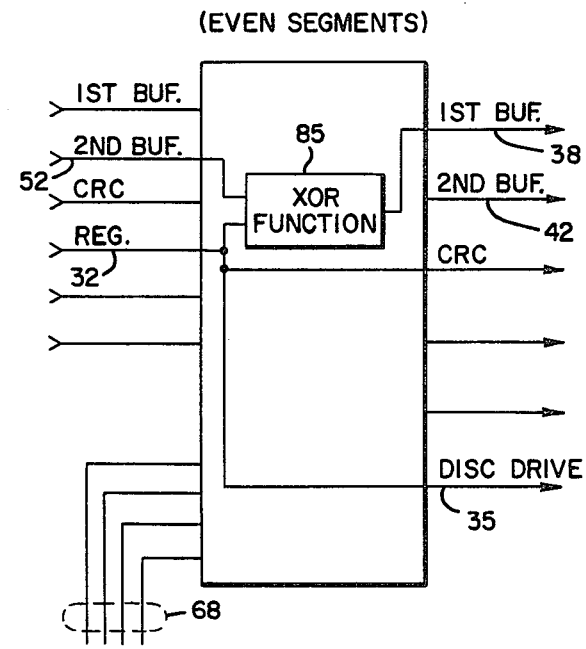
Figure 3C:
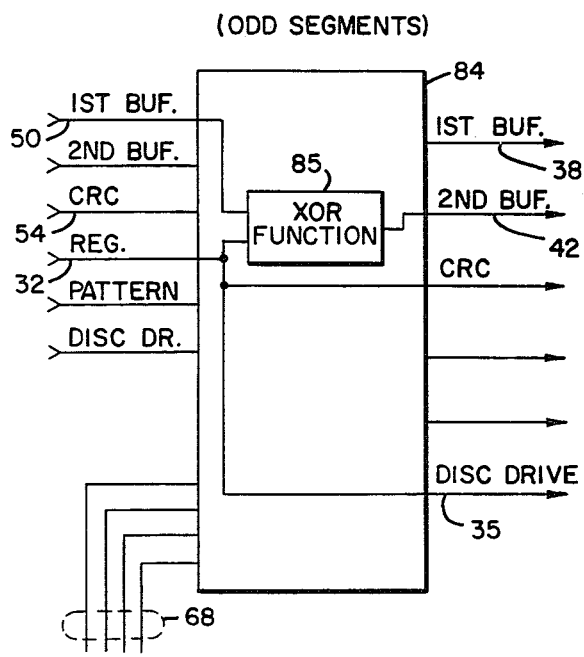
Figure 3D:
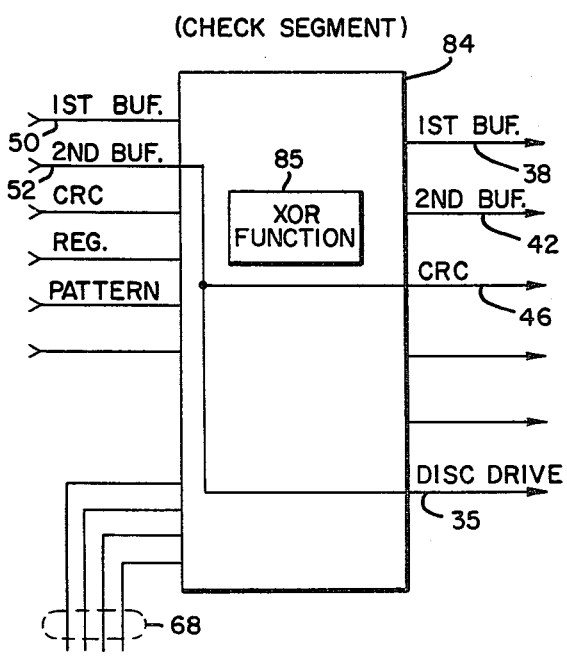

The above procedure is alternated for succeeding data segments, switch 34 directing data as depicted in FIG. 3B during even segments and as depicted in FIG. 3C during odd segments. When the data fields in all data segments have been recorded, the data field in check segment 108 is recorded, and switch 34 controls data flow in the manner seen in FIG. 3D. The content of the second buffer, after recordation of the data field for the ninth data segment, is the XOR function of all preceding data segments and such is directly connected to path 35 for recordation in disk drive 16 and to path 46 for transmission to CRC generator 44. The connections effected by switch 34 as seen in FIG. 3D are for the case where the final data segment is an odd data segment. Obviously, if the final data segment were an even segment then circuit path 50 from the first buffer would be applied to circuit path 35.

Operation of the formatting apparatus of the present invention is typically commenced when CPU 15 sends data on main bus 14 to peripheral processing unit 13 with a command to store the data. Referring to FIG. 2, the data is conveyed over path 18 to shift register 30 and the command signals are conveyed over path 20 to microprocessor 28. The microprocessor loads pattern store 72 on path 76 with the signals for time code portion 104 (see FIGS. 4–6). When the appropriate header 88 is read by the read/write head in disk drive 16, a signal is applied on path 55 to control and timing circuit 56. The latter circuit applies a signal on path 68 which forces switch 34 to write over path 35 a series of zeros to form gap 96 on the medium in disk drive 16. Next, the control and timing circuit 56, acting over path 68, forces switch 34 to write a series of ones which constitute sync portion 100 of the first data segment 100. Then one segment of data from shift register 30 is coupled by switch 34 from circuit path 32 to circuit path 35 to effect recordation of data field 102 in disk drive 16. During such recordation of the data field of data segment 1 (see FIG. 3A), such data field is coupled over circuit path 42 to second buffer 40 in which the data is temporarily stored. At the same time, the data is coupled over path 46 to CRC generator 44. Upon completion of the recordation of the data field, a time code signal is coupled from pattern store 72 on path 78, and under the influence of the control signal on circuit path 68, the time code is transmitted over circuit path 35 for recordation in the disk drive and over circuit path 46 to CRC generator. Upon completion of recordation of the time code, CRC generator 44 generates a CRC signal that is a function of both the data recorded in data field 102 and the time code recorded in time code portion 104. Such CRC signal is connected by switch 34 from circuit path 64 to circuit path 35 for recordation in disk drive 16. Thereafter, a gap equivalent to gap 96 is recorded under control of the signal on circuit path 68 which causes switch 34 to force a series of zeros on path 35.

Data segment 2 is recorded next and commences with a sync signal 100. Then data from register 30 is connected over path 32 through switch 34 to circuit path 35 to establish data field 102 for data segment 2. The data is also coupled to CRC generator 44 on path 46. See FIG. 3B. Simultaneously with recording the data field for data segment 2, the content of second buffer 40 is applied to switch 34 on path 52 and is XORed with the data entering on path 32 by means of XOR function 85. The XORed data is conducted on path 38 for temporary storage in first buffer 36. The XORed data is stored in first buffer 36 during completion of recording of data segment number 2 which includes a time code portion 104, a CRC portion 106 and a gap 96.

Recordation of the third data signal then proceeds with recordation of a sync portion 100. During recordation of the data field in data segment 3, switch 34 is supplied with an appropriate control signal over circuit path 68 to effect the connections shown in FIG. 3C. As seen in FIG. 3C, data from register 30 is connected from input circuit path 34 to output circuit path 35 for transmittal to disk drive 16 and to path 46 for transmittal to CRC generator 44. The data is also XORed with the data stored in first buffer 36, the output of the XOR function being connected via path 42 to second buffer 40. After the data field for segment 3 is stored in disk drive 16, a time code, CRC signal and gap are recorded.

The data fields for subsequent even numbered segments are handled as seen in FIG. 3B which shows that as the data field is conveyed to disk drive 16 and to CRC generator, the data is XORed with the contents of second buffer 40. The data fields in subsequent odd segments are handled as shown in FIG. 3C in which as data is recorded in disk drive 16 the data is XORed with the contents of first buffer 36.

The final segment in sector 86, as explained previously in connection with FIG. 4, is a check segment 108. After a sync portion 100 of the check segment is recorded in disk drive 16 the output of second buffer 40 is connected to circuit path 35 for recordation in the disk drive and to circuit path 46 for transmittal to CRC generator 44. At this time, the second buffer contains the XOR function of the data fields in data segments 1-9, inclusive. When the data field for check segment 108 has been written, a time code and CRC signal are recorded and storage of the data sector is complete.

Read out of the data occurs when a unit, such as CPU 15, on main bus 14 calls for the data sector recorded as described next above. PPU 13 and the circuit of the invention cause the data in the addressed sector to be delivered from disk drive 16 to the main bus. After the desired sector is located by identification of its header 88, the data is conveyed from disk drive 16 to switch 34 on path 81. Switch 34 connects the data to register 30 on path 48 and to CRC generator 44 on path 46. The output of register 30 is coupled to PPU 13 on data bus 18 to effect delivery of the data to main bus 14. When the data from data field 102 of the first data segment has been read, the time code is applied by switch 34 to CRC generator 44 and to first buffer 36 so that the time codes in subsequent segments can be compared with the temporarily stored time code. After the time code has been read, CRC generator 44 contains a newly generated CRC signal that is a function of the data field and time code in the first data segment. Such newly generated CRC signal is applied to switch 34 on path 54 for comparison with the CRC signal 106 as read from the medium in disk drive 16 and as applied to switch 34 on path 81. The result of the comparison is manifested on flag output path 55, one state indicating equality of the two CRC signals and an opposite state indicating inequality. The flag is applied to microprocessor 28 through control and timing circuit 56 for transmission with status information over main bus 14 to the CPU.

Read out of subsequent data segments is as described in the immediately preceding paragraph except that the time code in each succeeding data segment is compared with the time code stored in buffer 36 from the first data segment. A flag signal indicating equality or inequality of the time codes is applied to flag output path 55 and to the main bus.

When check segment 108 is applied over path 81 to switch 34, it is coupled over path 42 for temporary storage in buffer 40. The flag signals produced on flag output path 55 are conveyed to microprocessor 28 through control and timing circuit 56. Microprocessor 28 determines whether the time code for the segments match and whether the CRC signal for each segment is correct. If only one segment has a CRC error and all other segments have matching time codes, the microprocessor produces a status signal that indicates that the data can be recovered. The status signal is made available to the CPU on main bus 14. If the circuit of the invention is so instructed by the CPU, the check segment temporarily stored in buffer 40 is applied to switch 34 on path 52 and then to register 30 on path 48 for delivery to the main bus.

Thus, it will be seen that the present invention provides a data format for recordation in a disk drive which permits both detection of occurrence of an error and reconstruction of the data when only one segment has been erroneously recorded. This mode of operation is made possible because, as the data field and time code in each segment are recorded, a CRC signal for that individual data segment and time code is produced and recorded and because the data in each data field are accumulated and combined according to a prescribed function with data in all other data fields to produce a check signal from which data in one segment can be reconstructed if the data in such segment are erroneously recorded or read out and if the time code in every segment is identical. In the specific embodiment described above and shown in the drawings, the prescribed function employed in combining all data fields to produce the check segment is an XOR function; such function is exemplary, not limiting. Because the formatting apparatus of the invention can be introduced between an existing peripheral processing unit and an existing disk drive, the advantages of the invention can be achieved without significant equipment replacement or redesign.

Although one embodiment of the invention has been shown and described, it will be obvious that other adaptations and modifications can be made without departing from the true spirit and scope of the invention.

What is claimed is:

1. Apparatus for recording data in the form of a sector of serially occurring binary bits onto a storage medium comprising means for sequentially grouping the bits into n data segments wherein n is a positive integer greater than one and each data segment includes 1/n times the number of bits in said sector, means coupled to said grouping means for transmitting the bits in a data segment to said storage medium, means coupled to said grouping means for temporarily storing a data segment of bits, means coupled to said grouping means and said storing means for combining in accordance with a prescribed function the bits of the data segment in said storing means with the bits in the immediately succeeding data segment thereby to update the contents of said storing means as each data segment is transmitted to said storage medium, means responsive to the bits in a data segment for generating a CRC signal, means for coupling the CRC signal to said transmitting means so that the CRC signal is applied to the storage medium in association with the data segment in response to which the CRC signal is generated, and means for transmitting the content of said storing means to said storage medium for storage thereinafter the nth data segment and the CRC signal associated therewith, thereby to establish a check segment containing a data pattern representative of the data stored in all said data segments.

2. Apparatus according to claim 1 wherein said combining means includes means for producing an exclusive OR function so that the prescribed function is an exclusive OR function whereby the data pattern established in the check segment is the exclusive OR function of all said data segments.

3. Apparatus according to claim 1 including means for producing a time code bit pattern and means for applying said time code bit pattern to said storage medium adjacent each said data segment and said check segment.

4. Apparatus according to claim 3 including means for coupling said time code bit pattern to said CRC signal generating means so that the CRC signal applied to said storage medium is a function of the data in said data segment and said time code bit pattern.

5. Apparatus according to claim 1 in combination with switch means for interconnecting said grouping means said storage medium, said temporary storing means and said CRC signal generating means, said switch means including a ROM having a plurality of input terminals, a plurality of output terminals, a plurality of control terminals, means for generating said prescribed function, a first one of said input terminals and a first one of said output terminals being connected to said grouping means, a second one of said input terminals and a second one of said output terminals being connected to said storage medium, a third one of said input terminals and a third one of said output terminals being connected to said temporary storing means, and a fourth one of said input terminals and a fourth one of said output terminals being connected to said CRC signal generating means, and a control and timing circuit coupled to said control terminals for effecting recordation of said data segments and said check segment.

6. Apparatus according to claim 5 wherein said prescribed function generating means includes means for generating an exclusive OR function.

7. Apparatus according to claim 5 wherein said control and timing means is constructed and arranged to effect recovery of data from said storage medium and includes first interconnecting means for interconnecting said second input terminal to said first, third and fourth output terminals to transfer one data segment from said storage means to said grouping means, said temporary storing means and said CRC generating means, said CRC generating means generating a CRC signal in response to the data in said one data segment transferred from said storage medium, second interconnecting means being operable after said first interconnecting means for comparing said fourth input and said second input so as thereby to compare the CRC signal generated in said CRC generating means with the CRC signal transferred from said storage medium, said switch means including a fifth output terminal and being adapted to couple a flag signal to said fifth output terminal in response to inequality of the generated and transferred CRC signals.

8. A method for storing a sector of serially occurring data bits onto a storage medium comprising the steps of recording onto the medium a first segment of data, the first segment having 1/n times the number of bits in the sector, wherein n is a positive integer greater than one, deriving a first CRC signal from the data in the first segment during recording thereof, then writing said first CRC signal onto the medium after said first segment, temporarily storing the data in the first segment, then recording a second segment of data onto the medium, said second segment having 1/n bits, deriving a second CRC signal from the data in the second segment during recording thereof, then writing said second CRC signal onto the medium after said second segment, combining the data in the second segment with the temporarily stored data from the first segment in accordance with a prescribed function to form a data block uniquely representative of the combination of the data in all segments previously recorded, temporarily storing the data block, repeating said recording, deriving, writing, storing and combining steps for all segments from the third segment to the nth segment, the final combining step producing a combined data block, and then recording the combined data block onto the medium as a check segment after the nth segment.

9. A method for storing a sector of data on a magnetic medium comprising the step of serially dividing the sector into a plurality of segments wherein each segment contains less data than the sector, recording each segment on the magnetic medium, recording after each segment a time code indicative of the time of recording the sector, generating from the data in the segment and the time code associated with the data a CRC signal having a value representative of the data and the time code, temporarily storing the data in each segment as it is recorded, generating from temporarily stored data a data block that is a prescribed function of the temporarily stored data and the data in all previously recorded data segments, and recording the data block as a check segment after all data segments have been recorded so as to afford reconstruction of the data in one data segment from the data in the other data segments and the check segment.

* * * * *